United States Patent
Alsalamah (10) Patent No.: US 9,503,628 B1
(45) Date of Patent: Nov. 22, 2016

(54) CAMERA MOUNTING AND CONTROL DEVICE

(71) Applicant: Yahya Hussain Alsalamah, Najran (SA)

(72) Inventor: Yahya Hussain Alsalamah, Najran (SA)

( * ) Notice: Subject to any disclaimer, the term of this patent is extended or adjusted under 35 U.S.C. 154(b) by 0 days.

(21) Appl. No.: 14/793,502

(22) Filed: Jul. 7, 2015

(51) Int. Cl.
  *H04N 5/232* (2006.01)
  *G03B 17/56* (2006.01)
  *H04N 5/225* (2006.01)

(52) U.S. Cl.
  CPC ........ *H04N 5/23203* (2013.01); *G03B 17/561* (2013.01); *H04N 5/2251* (2013.01); *H04N 5/23293* (2013.01)

(58) Field of Classification Search
  CPC .............. H04N 5/23203; H04N 5/2251; H04N 5/23293; G03B 17/561
  See application file for complete search history.

(56) References Cited

U.S. PATENT DOCUMENTS

| | | | |
|---|---|---|---|
| 2006/0139459 A1 | 6/2006 | Zhong | |
| 2008/0055409 A1* | 3/2008 | Mars | G03B 37/02 348/143 |
| 2009/0086015 A1* | 4/2009 | Larsen | F41G 3/165 348/46 |
| 2012/0188158 A1 | 7/2012 | Tan et al. | |
| 2014/0028546 A1 | 1/2014 | Jeon et al. | |
| 2014/0063055 A1* | 3/2014 | Osterhout | G06F 3/005 345/633 |

OTHER PUBLICATIONS

Apple; "Gesture camera by Bisimplex"; Description; What's New in Version 2.0; Screenshots; 2014; https://itunes.apple.com/in/app/gesture-camera/id492769070?mt=8.

* cited by examiner

*Primary Examiner* — Tuan Ho
(74) *Attorney, Agent, or Firm* — Oblon, McClelland, Maier & Neustadt, L.L.P.

(57) ABSTRACT

A camera mounting device and method including a rectangular frame fixed on a foldable stand, a turn table having a mounting attachment for a camera, a directional antenna and a laser rangefinder, a tilting platform placed within the rectangular frame and fixed to a driven elevation gear, an azimuth motor connected to the turn table and fixed on the tilting platform within the rectangular frame, an elevation motor mounted within the rectangular frame and connected to a driving elevation gear that engages with the driven elevation gear of the tilting platform, a camera mounting controller that controls the azimuth motor and elevation motor, and implements a process for determining an azimuth angle and an elevation, and a wearable remote control having the camera mounting controller, a display screen and an omnidirectional antenna that communicates with the direction antenna.

12 Claims, 6 Drawing Sheets

CAMERA MOUNTING AND CONTROL DEVICE

BACKGROUND

1. Field of the Disclosure

This application relates generally to a camera mounting device. More particularly providing improvements related to directing a camera mounted on the camera mounting device using a wireless remote control with a display screen to display a topology of an area.

2. Description of the Related Art

Still photography and motion photography is commonly found in the entertainment industry as well as personal hobby. A camera used for photography is often mounted on a mounting device to take a photograph or record a video. The mounting device provides a stable surface required to take a noise free and vibration free photo or a video, especially when taking photos at night or shooting an hour long video.

A tripod is a traditional camera mounting apparatus that is used in both still photography, and motion photography. The tripod has three legs and a mounting head on which a camera can be installed. The mounting head includes a screw to hold the camera. The tripod and the mounting head also include several joints that allow user to rotate, pan, or tilt the camera as desired. Typically a handle is provided on the mounting head that must be moved manually to orient the camera to a desired direction, which also requires simultaneous viewing through the camera sight.

The movement of the mounting head as well as the functions of a camera can be controlled remotely using software installed on the camera. However, these software and remote control features are proprietary and have limited usability. Certain standard features implemented in the camera and the remote control include button to capture an image or record a video remotely.

The existing technology related to camera mounting device has several limitations. For instance the photographer needs to watch the camera and the direction in which it is pointing and the direction in which it is moving based on the inputs provided using the remote control. Further the photographer may not receive automatic feedback that the target is exactly in sight or may not know if additional focusing is necessary. The photographer has to manually determine if the target is in sight and focused.

Although there are several camera mounting devices there are several limitations that need to be addressed. The present disclosure is an improvement over the existing camera mounting devices and provides high degree of automation and confidence in taking a picture. It can be helpful for people with disabilities and people with limited mobility.

SUMMARY

According to an embodiment of the present disclosure, there is provided a camera mounting system. The camera mounting system and method including a rectangular frame fixed on a foldable stand, a turn table having a mounting attachment for a camera, a directional antenna and a laser rangefinder, a tilting platform placed within the rectangular frame and fixed to a driven elevation gear, an azimuth motor connected to the turn table and fixed on the tilting platform within the rectangular frame, an elevation motor mounted within the rectangular frame and connected to a driving elevation gear that engages with the driven elevation gear of the tilting platform, a camera mounting controller that controls the azimuth motor and elevation motor, and implements a process for determining an azimuth angle and an elevation, and a wearable remote control having the camera mounting controller, a display screen and an omnidirectional antenna that communicates with the direction antenna.

Further, according to an embodiment of the present disclosure, there is provided a method for controlling the camera mounting device, the method includes loading a map on a display screen of a wearable remote control, selecting a target on the map, sending a signal to a camera and a camera mounting device from the wearable remote control, determining coordinates of the target selected on the map, determining coordinates of a user with respect to the camera mounting device, calculating a rotation angle of the camera mounting device, sending a rotation signal to an azimuth motor of the camera mounting device, displaying a camera-view on the display screen of the wearable remote control, selecting an elevation, and sending an elevation signal to an elevation motor of camera mount.

Further, according to an embodiment of the present disclosure, there is provided a non-transitory computer-readable medium which stores a program which, when executed by a computer, causes the computer to perform the method for controlling the camera mounting device, as discussed above.

The forgoing general description of the illustrative implementations and the following detailed description thereof are merely exemplary aspects of the teachings of this disclosure, and are not restrictive.

DETAILED DESCRIPTION

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

In the drawings or figures, the terms "top", "bottom", "left", "right", "vertical", and "horizontal" are based on a viewing perspective of the figure such that the captions are located approximately at the center and below a drawing. The term "top" refers to the part of the figure on the right side of the drawing with the caption located at the bottom of the figure. The term "left" refers to the part of the figure on the left side of the drawing with the caption (e.g., "FIG. 1") located below the figure. The term "right" refers to the part of the figure on the right side of the drawing with the caption located at the bottom of the figure.

Figure 1A:
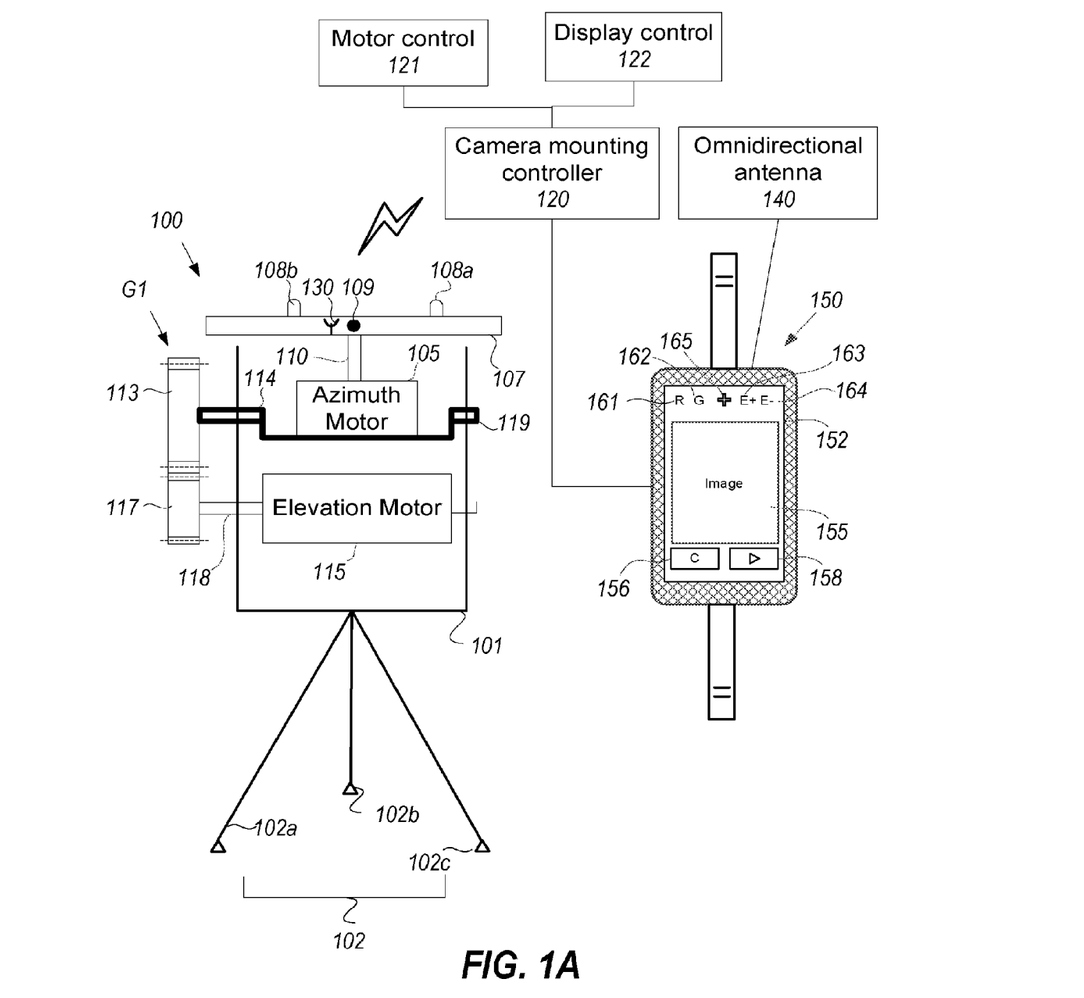
FIG. 1A illustrates a camera mounting apparatus according to an exemplary embodiment of the present disclosure.

FIG. 1A illustrates a camera mounting device according to an exemplary embodiment of the present disclosure. The camera mounting device 100 includes a rectangular frame 101, a stand 102, an azimuth motor 105, an elevation motor 115, a turn table 107, a laser rangefinder 109, a turn shaft 110, elevation gear G1 including a driven gear 113 and a driving gear 117, a titling platform 119, a camera mounting controller 120, a directional antenna 130, a omnidirectional antenna 140, and a wearable remote control 150.

The rectangular frame 101 can be open from more than one side or can be a box with open top. The rectangular frame 101 is configured to support the azimuth motor 105 and elevation motor 115. For instance, holes (not shown) are drilled on the side of the rectangular frame 101 corresponding to the shafts 114 and 118 connected to the tilting platform 119 and the elevation motor 115 respectively. Thus the holes (not shown) in the rectangular frame 101 help support the tilting platform 119 and the elevation motor 115 enclosed inside the rectangular frame 101. Alternatively, the elevation motor 115 can be fixed to the bottom surface of the rectangular frame 101 and shaft 114 of the tilting platform 119 can be mounted in a side recess on the inside of the rectangular frame 101. The rectangular box 101 can be detachably mounted on a stand 102 using fasteners such as screws or bolts, using a snap-fit arrangement which typically has a locating and locking feature, using welding or using adhesives. The stand 102 is a tripod with three legs 102a, 102b, and 102c that is foldable and extendable in length. Alternately, the stand 102 can be fixed to the bottom of the rectangular frame 101. The rectangular box 101 can be made from different materials such as metal like steel, aluminum, brass, or plastic.

The azimuth motor 105 is mounted on the tilting platform 119 inside rectangular box 101. The azimuth motor 105 can be mounted using fasteners such as screws or bolts, using a snap-fit arrangement which typically has a locating and locking feature, using welding or using adhesives. The azimuth motor 105 can be powered by an electric power supply or a battery. The azimuth motor 105 has a turn shaft 110 which is connected to the turn table 107. The azimuth motor 105 rotates the turn table 107 in a horizontal plane at an angle determined by the camera mounting controller 120. The calculations and the process to determine the angle of rotation of the turn table 107 is discussed with reference to FIGS. 2-5.

The turn table 107 includes mounting attachments such as dowel pins 108a and 108b, and laser rangefinder 109. The turn table 107 can be made of plastic, metallic or non-metallic material. The dowel pins 108a and 108b are used to mount a camera (not shown) on the turn table 107 such that there is no relative motion between the camera (not shown) and the turn table 107. In another embodiment, the mounting attachments can be of different types, for instance fasteners such as screw 108c (see FIG. 1B) that engages with a hole in the camera frame or a snap-fit arrangement which typically has a locating and locking feature. As such when the turn table 107 is rotated by the azimuth motor 105 in a horizontal plane, the camera (not shown) also rotate in the similar manner. The laser rangefinder 109 is installed on the turn table 107 and is used to measure the distance to an object. The data from the laser rangefinder 109 is processed by the camera mounting controller 120 to determine the distance to an object of interest.

Figure 1B:
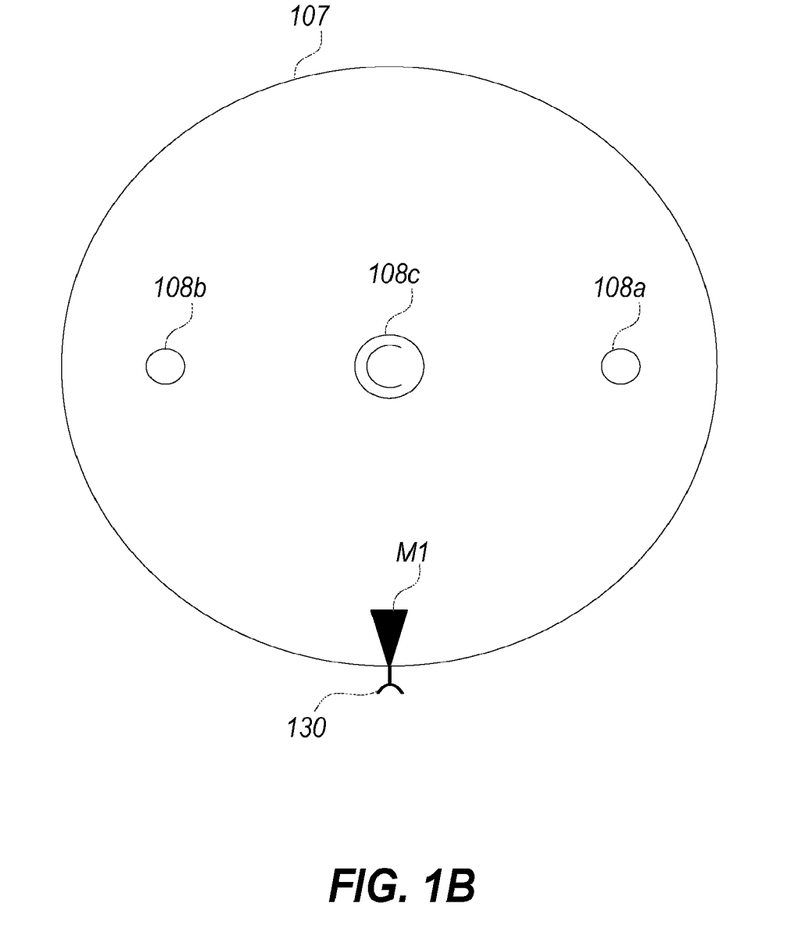
FIG. 1B illustrates a top view of a turn table of the camera mounting apparatus according to an exemplary embodiment of the present disclosure.

The turn table 107 also includes the directional antenna 130, which can be used for determining a rotation angle of the turn table 107. The direction antenna 130 communicates with the omnidirectional antenna 140. In another embodiment, the turn table 107 can include a line-of-sight marking M1 (as shown in FIG. 1B) indicating the direction in which the camera lens must focus when installed on the turn table 107.

For vertical adjustment of the turn table 107 or the camera (not shown) mounted thereon, the azimuth motor 105 is mounted on the tilting platform 119. The titling platform 119 is connected to the driven gear 113. The driven gear 113 meshes with the driving gear 117 connected to the elevation motor 115 via shaft 118. The elevation motor 115 rotates the driving gear 117, which in turn rotates the driven gear 113 causing the tilting platform 119 to pivot along a horizontal axis.

The elevation motor 115 can be powered by an electric power supply or a battery. The elevation motor 115 communicates with the camera mounting controller 120 which receives command to rotate from the wearable remote control 150. The command to rotate can be based on an user input entered on the interface of the wearable remote control 150 or can be automatically determined using pattern recognition or coordinates such as GPS coordinates of an object of interest. Further the amount of rotation of the elevation motor 115 also depends on the gear ratio of the elevation gear G1. For instance if the driving gear 117 has a diameter two times smaller than the driven gear 113, then one full rotation of the driving gear 117 will result in half a rotation of the driven gear 115.

The wearable remote control 150 is a device used to wirelessly control the camera mounting device 100. The wearable remote control 150 includes a touch screen 152, which displays an interface that includes an image area 155, a capture button 156, a record button 158, a preview button (not shown), a zoom button 165, a relative coordinate (hereafter referred as R button) button 161, a GPS button 162, an elevation increase button 163 (hereafter referred as E+ button), and an elevation decrease button 164 (hereafter referred as E− button). Additional buttons such as azimuth button (not shown) may also be added.

Figure 3A:
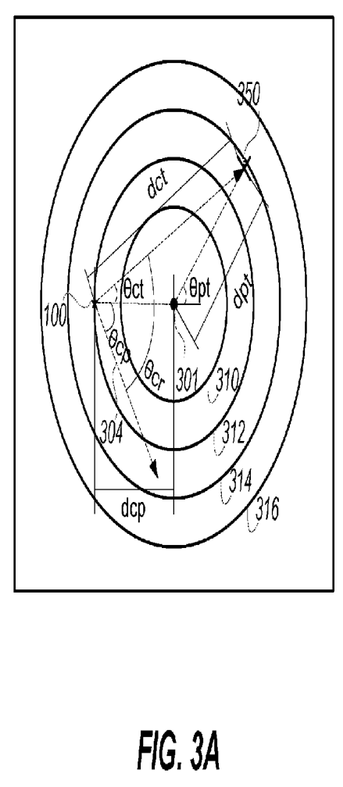
FIGS. 3A and 3B illustrate an azimuth angle determination process for the camera mounting device using relative coordinate system according to an embodiment of the present disclosure.

The image area 155 displays an image such as an interactive map of an area. The interactive map can be, for instance, a digital map, a floor map, or a contour map indicating distances. Further on the map, the position of a user (e.g., a photographer) and the camera mounting device 100 can be marked. A user can select any point on the interactive map. The coordinates of the selected point on the interactive map can be determined using the R button 161, or the GPS button 162. The calculations underlying the R button 161 is discussed with reference to FIG. 3 and the calculations underlying the GPS button 162 is discussed with reference to FIG. 4. The capture button 156 sends a signal to the camera (not shown) to capture an image. The record button 158 sends a signal to activate a video recording feature of the camera (not shown). The preview button allows the user to preview the image captured by the camera. The zoom button 165 allows zoom-in and zoom-out of the image displayed in the image area 155. The E+ button 163 sends signal to the elevation motor 115 of the camera mounting device 100 to increase the angle of line of sight of the camera thus pointing at a higher elevation than original position The E− button 164 sends signal to the elevation motor 115 of the camera mounting device 100 to decrease the angle of line of sight of the camera thus pointing to a lower elevation than original position. The increment in elevation is based on the parameters such as step of the elevation motor 115 or gear ratio of the elevation gear G1.

The present disclosure is not limited to the above mentioned graphical interface displayed on the touch screen 152. The look and feel of the graphical interface can be coded and displayed in several ways depending on the user preference and performance optimization of the wearable remote control 150.

Figure 2:
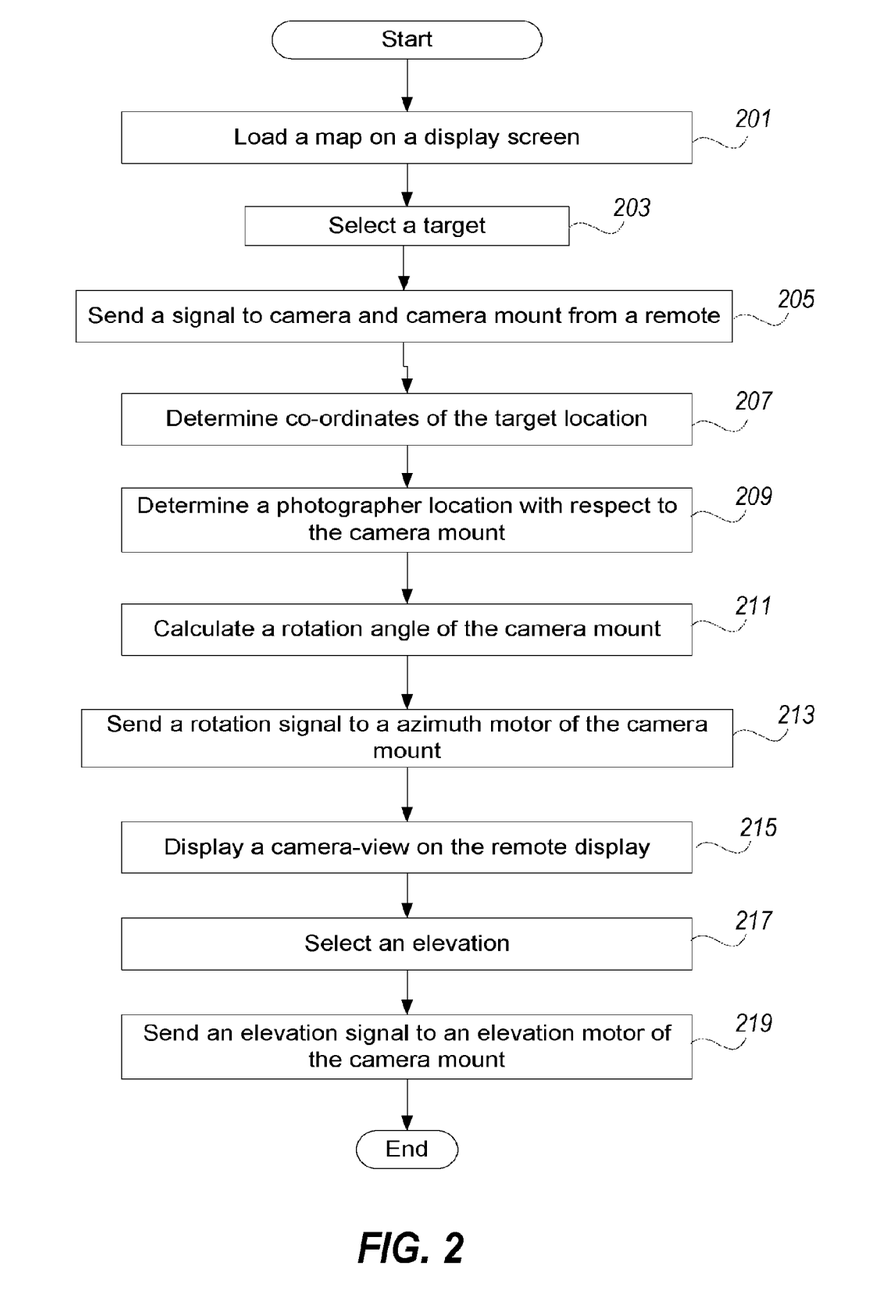
FIG. 2 illustrates a process to control the camera mounting device using a wearable remote control according to an embodiment of the present disclosure.

FIG. 2 illustrates a process to control the camera mounting device using a wearable remote control according to an embodiment of the present disclosure. The process starts when a camera is installed on the turn table 107 such that the line of sight of the camera is parallel to the directional antenna 130 or aligned with the line of sight marking M1. In step 201, a map of the area is loaded on the display 152 of the wearable remote control 150. The map can be an interactive digital map, contour map of the area, or a simple distance map. Further on the map, the position of the user and the camera is marked. The interactive map allows for selection of a target or a location of the target to be photographed or recorded. In step 203, a target to be photographed is selected on the map displayed in the image area 155 of the wearable remote control 150. The selection can be performed by tapping a particular area in the map. Further, a zoom function may be used to view finer details of a particular area on the map that will enable selection of a more accurate target position. Note than a target can be the user itself, in which case the camera can focus on the user automatically using step 205. For instance, if the user is at location A, the camera mounting device 150 rotates towards location A and the camera can auto-detect the user face. If the user is at location B, the camera mounting device 150 rotates towards location B and the camera can auto-detect the user face.

In step 205, the wearable remote control 150 sends a signal to the camera and the camera mounting device 150. A first signal is sent by the omnidirectional antenna 140 mounted on the wearable remote control 150 and is received by the direction antenna 130 mounted on the camera mounting device 150, while a second signal can be sent to the camera wirelessly using WiFi (for example) technology. The signal communication can be used for various purposes such as position determination and control of the camera mounting device 100 or performing particular camera functions such as zoom, capture, record etc. In order to control the camera, wireless control modules of camera can be incorporated in the wearable remote control 150.

In step 207, the coordinates of the target location are determined. The coordinates can be determined using a relative reference coordinate system such as one discussed in FIG. 3 or using as absolute coordinate system such as a Global Positioning System (GPS) coordinates as discussed in FIG. 4. The relative reference coordinate system is particularly useful when the camera and the target have approximately similar elevation and the camera and target are approximately close to each other, for example, a kid on a playground in a park or an athlete in a football field. The GPS coordinate system is particularly useful when the target is farther from the camera mounting device 100 and at a different elevation than the camera mounting device 100.

The coordinate information can be stored in a database and can be updated as the information changes. The coordinate information can be of different types such as initial coordinates established before the control of the camera mounting device 100, a rotation coordinates obtained after the control of the camera mounting device 100, or any other intermediate control commands issued by the wearable remote control 150.

In step 209, the relative distance between the camera mounting device 100 and the user is determined. The relative distance can be determined using the antennas 130 and 140 or using the laser rangefinder 109. Further the relative angle between the line of sight of the camera and the user can also be determined using the antennas 130 and 140 or using the laser rangefinder 109. The distance and the angle related information can be stored in a database and can be updated as the information changes.

In step 211, the angle of rotation (also referred as azimuth angle) of the camera mounting device 100 is determined to point the camera in the direction of the target location. The angle of rotation of the camera mounting device 100 can be determined in different ways depending on selection of the R button 161 or the GPS button 162. The angle of rotation calculations are discussed with reference to FIG. 3 and FIG. 4.

Figure 4:
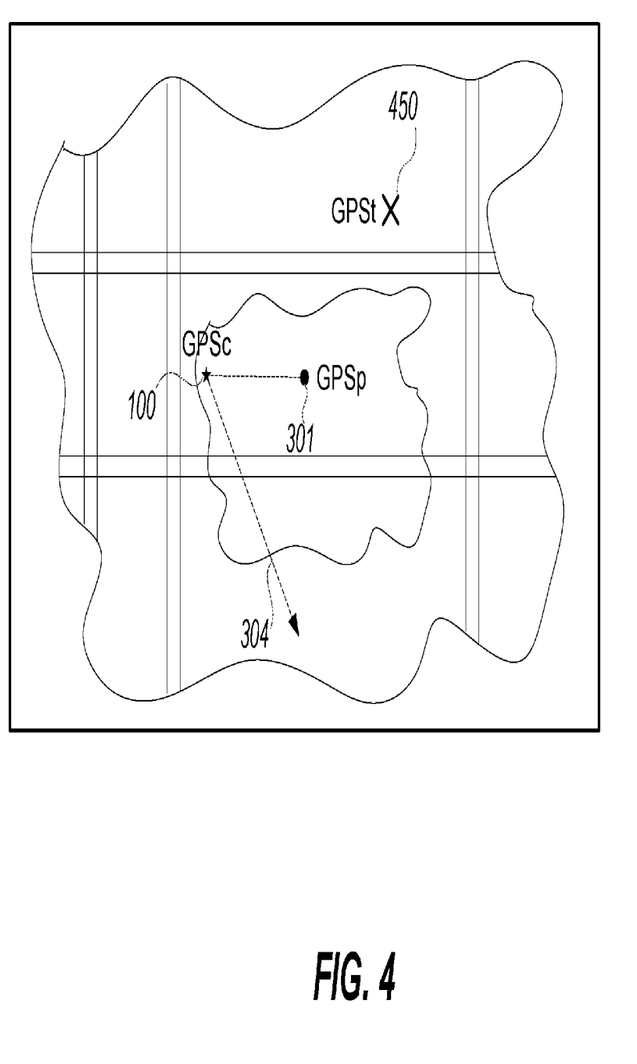
FIG. 4 illustrates an azimuth angle determination process for the camera mounting device using a GPS coordinate system according to an exemplary embodiment of the present disclosure.

In step 213, the azimuth angle calculated in FIG. 4 is send to the azimuth motor 105 of the camera mounting device 100. The azimuth motor 105 then rotates the turn table 107 at the calculated azimuth angle, as such the camera, particularly the line of sight of the camera, points in the direction of the target. In step 215, the camera view is displayed in the image area 155 of the wearable remote control 150. The user can then choose to perform any camera function such as zoom, capture or record.

Additionally, in step 217, the elevation of the camera mounting device may be adjusted. The elevation can be increased or decreased using the E+ button 163 or the E− button 164 respectively depending on the target elevation. If the target is located below the line of sight of the camera the E+ button 163 may be used and if the target is located above the line of sight of the camera the E− button 164 may be used. Once a desired elevation is achieved, the user can then choose to perform any camera function such as zoom, capture or record.

In step 219, the elevation signal is sent to the elevation motor 115 of the camera mounting device 100. Based on whether the elevation needs to be increased or decreased the elevation motor rotates the driving gear 113 in counterclockwise direction or clockwise direction respectively.

The present embodiment is not limited to the discussed camera functions and the camera mounting device 100. In another embodiment, several functions can be performed simultaneously such as the recording function of the camera can be performed while the camera mounting device 100 is moving. Further, several steps in the above process can be performed in parallel such as steps 203, 205, 207 or 209.

Figure 3B:
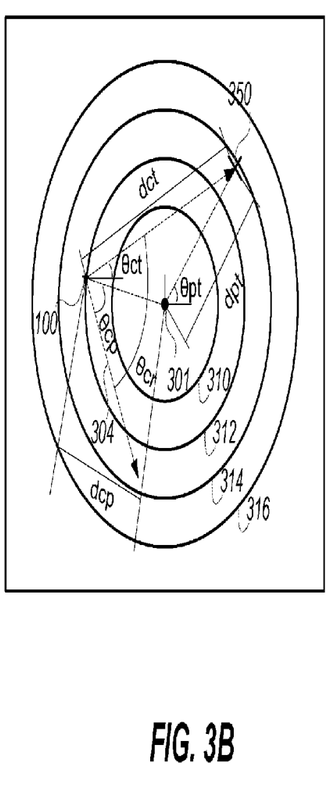

FIGS. 3A and 3B illustrate an azimuth angle determination process for the camera mounting device 100 using relative coordinate system. An exemplary map showing contours 310, 312, 314 and 316, a photographer 301, and the camera mounting device 100 is displayed in the image area 155 of the wearable remote control 150 (shown in FIG. 1). The contours 310, 312, 314, and 316 may represent distance increments from a photographer 301. For instance, the contour 310 represents a circle at a distance of 5 m from the photographer 301, the contour 312 represents a circle at a distance of 15 m from the photographer 301, etc. A target 350 is located at a distance dpt, which is within the contour 314. The coordinates of the target 350 with respect to the photographer 301 are represented by a photographer-to-target angle θpt and a photographer-to-target distance dpt. The photographer-to-target angle θpt is measured with respect to the x-axis of the photographer's coordinate system. The photographer-to-target distance dpt is measured from the photographer 301 to the target 350 with respect to the photographer's coordinate system.

Similarly, with respect to the coordinate system of the camera mounting device 100, measurements can be defined from the camera mounting device 100. For example, a camera-to-photographer distance dcp, a camera-to-photographer angle θcp, a camera-to-target distance dct, a camera-to-photographer target θct, and a rotation angle θr. The angular measurements are done in counter-clockwise direction from the x-axis. The camera-to-photographer distance dcp and the camera-to-photographer angle θcp can be easily determined by processing the signals send from the omni-directional antenna 140 and received by the directional antenna 130. Alternately, the turn table 107 with the laser rangefinder 109 (ion FIG. 1) can be rotated towards the photographer 301. Then the amount of rotation from the initial camera line of sight 304 to the photographer 301 can be recorded and converted into the camera-to-photographer angle θcp. Distance is one of the outputs of the laser rangefinder 109.

Further, the camera-to-target distance dct and the camera-to-photographer target θct can be determined using geometric relationships. For example, for FIG. 3A where the vertical distance between the camera mounting device 100 and the photographer 301 is zero, following equations 1, 2 and 3 can be formulated.

$$dct = \sqrt{(dpc + dpt * \cos(\theta pt))^2 + (dpt * \sin(\theta pt))^2} \quad (1)$$

$$\theta ct = \tan^{-1}\left(\frac{dpt * \sin(\theta pt)}{dpc + dpt * \cos(\theta pt)}\right) \quad (2)$$

$$\theta r = \theta cp + \theta ct \quad (3)$$

With reference to FIG. 3A, the rotation angle θr is the sum of angle between the camera line of sight 304 and the camera-to-target angle. Similarly, a different set of equations can be derived for FIG. 3B where vertical distance between the camera mounting device 100 and the photographer 301 is not zero.

FIG. 4 illustrates an azimuth angle determination process for the camera mounting device 100 using a GPS coordinate system. An exemplary map showing a street map of an area, a photographer 301, and the camera mounting device 100 is displayed in the image area 155 of the wearable remote control 150 (shown in FIG. 1). The GPS coordinates of the photographer 301, the camera line of sight 304, and the target 450 are GPSp, GPSc, GPSt respectively. The photographer 301 can enter the GPS coordinates, GPSt, of the target 450 in the wearable remote control 150 using the GPS button 162 displayed on the touch screen 152. The GPSt coordinates can be transmitted to the camera mounting device 100 and used to calculate the difference between the GPSc and GPSt, based on which the angle of rotation θr can be calculated. The angle of rotation θr is then sent to the azimuth motor 105 (in FIG. 1). The GPS coordinates also include elevation information which can be used to calculate the elevation difference between the camera line of sight 304 and the target 450. The elevation difference can be further sent to the elevation motor 115 (in FIG. 1) to adjust the elevation of the camera.

Figure 5:
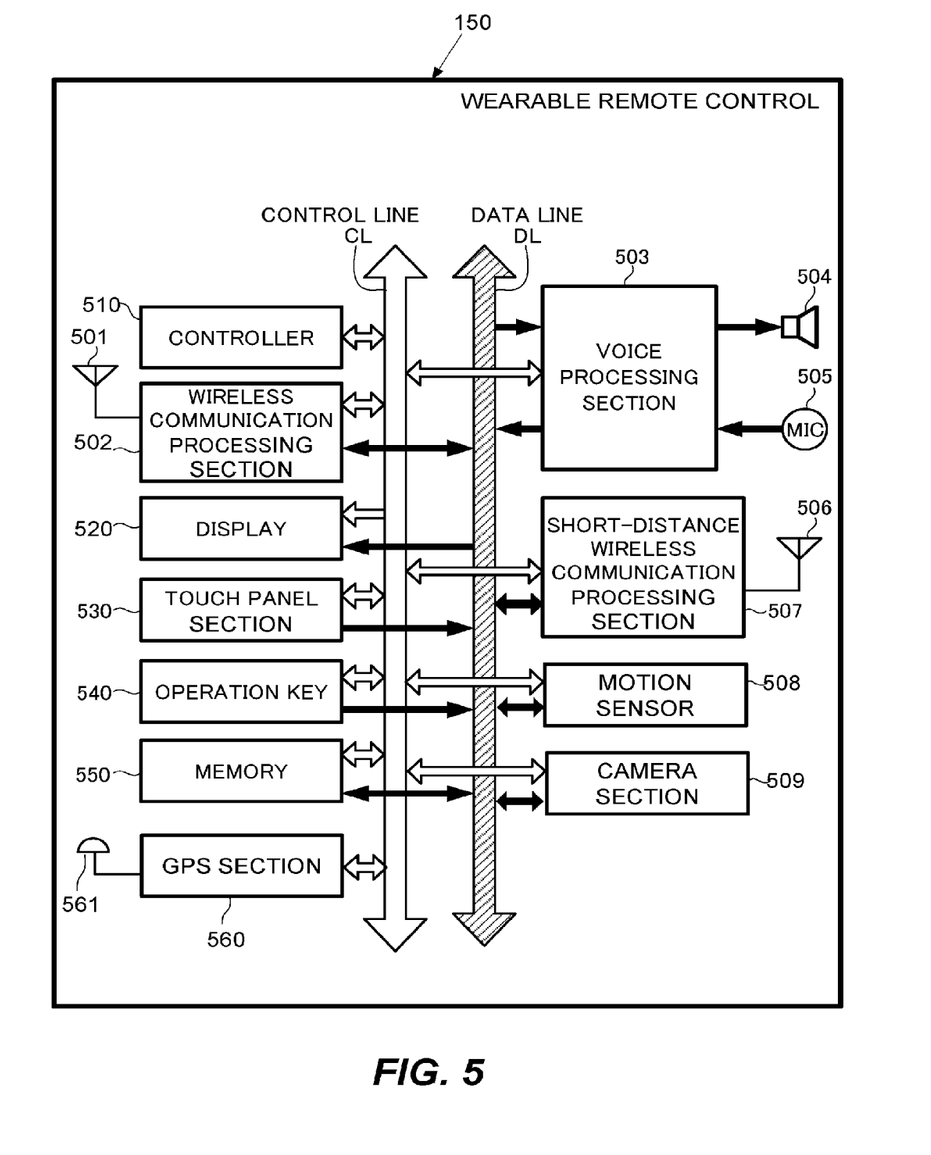
FIG. 5 is a detailed block diagram illustrating an exemplary wearable remote control according to an exemplary embodiment of the present disclosure.

FIG. 5 is a detailed block diagram illustrating an exemplary wearable remote control 150 according to certain embodiments of the present disclosure. In certain embodiments, the wearable remote control 150 may be a smartphone. However, the skilled artisan will appreciate that the features described herein may be adapted to be implemented on other devices (e.g., a laptop, a tablet, a server, an e-reader, a camera, a navigation device, etc.). The exemplary wearable remote control 150 of FIG. 5 includes a controller 510 and a wireless communication processor 502 connected to an antenna 501. A speaker 504 and a microphone 505 are connected to a voice processor 503.

The controller 510 is an example of the camera mounting controller 120 shown in FIG. 1 and may include one or more Central Processing Units (CPUs), and may control each element in the wearable remote control 150 to perform functions related to communication control, audio signal processing, control for the audio signal processing, still and moving image processing and control, and other kinds of signal processing. The controller 510 may perform these functions by executing instructions stored in a memory 550. Alternatively or in addition to the local storage of the memory 550, the functions may be executed using instructions stored on an external device accessed on a network or on a non-transitory computer readable medium. As described above in relation to FIG. 1, the controller 510 may execute instructions allowing the controller 510 to function as the motor control 121 and display control 121 as depicted in FIG. 1.

The memory 550 includes but is not limited to Read Only Memory (ROM), Random Access Memory (RAM), or a memory array including a combination of volatile and non-volatile memory units. The memory 550 may be utilized as working memory by the controller 510 while executing the processes and algorithms of the present disclosure. Additionally, the memory 550 may be used for long-term storage, e.g., of image data and information related thereto. The memory 550 may be configured to store the battle view information, operation view information and list of commands.

The wearable remote control 150 includes a control line CL and data line DL as internal communication bus lines. Control data to/from the controller 510 may be transmitted through the control line CL. The data line DL may be used for transmission of voice data, display data, etc.

The antenna 501 (for example directional antenna 130 and the omnidirectional antenna 140) transmits/receives electromagnetic wave signals between base stations for performing radio-based communication, such as the various forms of cellular telephone communication. The wireless communication processor 502 controls the communication performed between the wearable remote control 150 and other external devices via the antenna 501. For example, the wireless communication processor 502 may control communication between base stations for cellular phone communication.

The speaker 504 emits an audio signal corresponding to audio data supplied from the voice processor 503. The microphone 505 detects surrounding audio and converts the detected audio into an audio signal. The audio signal may then be output to the voice processor 503 for further processing. The voice processor 503 demodulates and/or decodes the audio data read from the memory 550 or audio data received by the wireless communication processor 502 and/or a short-distance wireless communication processor 507. Additionally, the voice processor 503 may decode audio signals obtained by the microphone 505.

The exemplary wearable remote control 150 may also include a display 520 (for example the image area 155), a touch panel 530 (for example touch screen 151), an operation key 540, and a short-distance communication processor 507 connected to an antenna 506. The display 520 may be a Liquid Crystal Display (LCD), an organic electroluminescence display panel, or another display screen technology. In addition to displaying still and moving image data, the display 520 may display operational inputs such as R button 161, GPS button 162, E+ button 163, E− button 164, capture button 156 and record button 158 shown in FIG. 1, used for control of the wearable remote control 150. The display 520 may additionally display a GUI, such as touch screen 152 in FIG. 1, for a user to control aspects of the wearable remote control 150 and/or other devices. Further, the display 520 may display characters and images received by the wearable remote control 150 and/or stored in the memory 550 or accessed from an external device on a network such as a camera. For example, the wearable remote control 150 may access a network such as the Internet and display text and/or images transmitted from a Web server.

The touch panel 530 may include a physical touch panel display screen and a touch panel driver. The touch panel 530 may include one or more touch sensors for detecting an input operation on an operation surface of the touch panel display screen. The touch panel 530 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 530 may detect when the stylus approaches/contacts the operation surface of the touch panel display (similar to the case in which a finger is used for the touch operation).

One or more of the display 520 and the touch panel 530 are examples of the touch screen 152 depicted in FIG. 1 and described above.

In certain aspects of the present disclosure, the touch panel 530 may be disposed adjacent to the display 520 (e.g., laminated) or may be formed integrally with the display 520. For simplicity, the present disclosure assumes the touch panel 530 is formed integrally with the display 520 and therefore, examples discussed herein may describe touch operations being performed on the surface of the display 520 rather than the touch panel 530. However, the skilled artisan will appreciate that this is not limiting.

For simplicity, the present disclosure assumes the touch panel 530 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 530 may include transparent electrode touch sensors arranged in the X-Y direction on the surface of transparent sensor glass.

The touch panel driver may be included in the touch panel 530 for control processing related to the touch panel 530, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 530 may detect a position of a user's finger around an edge of the display panel 520 (e.g., gripping a protective case that surrounds the display/touch panel). Signals may be transmitted by the touch panel driver, e.g. in response to a detection of a touch operation, in response to a query from another element based on timed data exchange, etc.

The touch panel 530 and the display 520 may be surrounded by a protective casing, which may also enclose the other elements included in the wearable remote control 150. In certain embodiments, a position of the user's fingers on the protective casing (but not directly on the surface of the display 520) may be detected by the touch panel 530 sensors. Accordingly, the controller 510 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 510 may be configured to detect which hand is holding the wearable remote control 150, based on the detected finger position. For example, the touch panel 530 sensors may detect a plurality of fingers on the left side of the wearable remote control 150 (e.g., on an edge of the display 520 or on the protective casing), and detect a single finger on the right side of the wearable remote control 150. In this exemplary scenario, the controller 510 may determine that the user is wearing the wearable remote control 150 with his/her right hand because the detected grip pattern corresponds to an expected pattern when the wearable remote control 150 is wearing only with the right hand.

The operation key 540 may include one or more buttons or similar external control elements, which may generate an operation signal based on a detected input by the user. In addition to outputs from the touch panel 530, these operation signals may be supplied to the controller 510 for performing related processing and control. In certain aspects of the present disclosure, the processing and/or functions associated with external buttons and the like may be performed by the controller 510 in response to an input operation on the touch panel 530 display screen rather than the external button, key, etc. In this way, external buttons on the wearable remote control 150 may be eliminated in lieu of performing inputs via touch operations, thereby improving water-tightness.

The antenna 506 may transmit/receive electromagnetic wave signals to/from other external apparatuses, and the short-distance wireless communication processor 507 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 507. The direction antenna 130 and the omnidirectional antenna 140, in FIG. 1, are an example of the antenna 506. Further signals can be processed by the short-distance wireless communication process 507 to determine the position of a target with respect to a camera mounted on the camera mounting device 100 as discussed earlier with respect to FIGS. 3A and 3B.

The wearable remote control 150 may include a motion sensor 508. The motion sensor 508 may detect features of motion (i.e., one or more movements) of the wearable remote control 150. For example, the motion sensor 508 may include an accelerometer to detect acceleration, a gyroscope to detect angular velocity, a geomagnetic sensor to detect direction, a geo-location sensor to detect location, etc., or a combination thereof to detect motion of the wearable remote control 150. In certain embodiments, the motion sensor 508 may generate a detection signal that includes data representing the detected motion. For example, the motion sensor 508 may determine a number of distinct movements in a motion (e.g., from start of the series of movements to the stop, within a predetermined time interval, etc.), a number of physical shocks on the wearable remote control 150 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 510, whereby further processing may be performed based on data included in the detection signal. The motion sensor 508 can work in conjunction with a Global Positioning System (GPS) section 560. The GPS section 560 detects the present position of the target, the camera mounting device 100, and the user. The information of the present position detected by the GPS section 560 is transmitted to the controller 510 for further processing as discussed with respect to FIG. 4. An antenna 561 is connected to the GPS section 560 for receiving and transmitting signals to and from a GPS satellite.

The wearable remote control 150 may include a camera section 509, which includes a lens and shutter for capturing photographs of the surroundings around the wearable remote control 150. In an embodiment, the camera section 509 captures surroundings of an opposite side of the wearable remote control 150 from the user. The images of the captured photographs can be displayed on the display panel 520. A memory section saves the captured photographs. The memory section may reside within the camera section 509 or it may be part of the memory 150. The camera section 509 can be a separate feature attached to the wearable remote control 150 or it can be a built-in camera feature.

Also, it should be understood that this technology when embodied is not limited to the above-described embodiments and that various modifications, variations and alternatives may be made of this technology so far as they are within the spirit and scope thereof. For example, this technology may be structured for cloud computing whereby a single function is shared and processed in collaboration among a plurality of apparatuses via a network.

What is claimed is:

1. A camera mounting system comprising:
   a rectangular frame fixed on a foldable stand;
   a turn table having a mounting attachment for a camera, a directional antenna and a laser rangefinder;
   a tilting platform placed within the rectangular frame and fixed to a driven elevation gear;
   an azimuth motor connected to the turn table and fixed on the tilting platform within the rectangular frame;
   an elevation motor mounted within the rectangular frame and connected to a driving elevation gear that engages with the driven elevation gear of the tilting platform;
   a camera mounting controller that controls the azimuth motor and elevation motor, and implements a process for determining an azimuth angle and an elevation; and
   a wearable remote control having the camera mounting controller, a display screen and an omnidirectional antenna that communicates with the direction antenna.

2. A camera mounting system according to claim 1, wherein
   the turn table has a circular shape.

3. A camera mounting system according to claim 1, wherein
   the turn table has a camera installation mark.

4. A camera mounting system according to claim 1, wherein
   the camera mounting controller includes an interface displayed on the display screen of the wearable remote control.

5. A camera mounting system according to claim 4, wherein
   the interface displayed on the display screen of the wearable remote control comprises an image area, an elevation button, a GPS button, a relative coordinate button, a capture button, and a record button.

6. A camera mounting system according to claim 1, wherein
   the display screen of the wearable remote control is a touch screen.

7. A method for controlling the camera mounting device, the method comprising:
   loading a map on a display screen of a wearable remote control;
   selecting a target on the map;
   sending a signal to a camera and a camera mounting device from the wearable remote control;
   determining coordinates of the target selected on the map;
   determining coordinates of a user with respect to the camera mounting device;
   calculating a rotation angle of the camera mounting device;
   sending a rotation signal to an azimuth motor of the camera mounting device;
   displaying a camera-view on the display screen of the wearable remote control;
   selecting an elevation; and
   sending an elevation signal to an elevation motor of camera mount.

8. The method for controlling the camera mounting device according to claim 7, wherein the coordinates of the target selected on the map are determined using a relative coordinate system.

9. The method for controlling the camera mounting device according to claim 7, wherein the coordinates of the target selected on the map are determined using a GPS coordinate system.

10. The method for controlling the camera mounting device according to claim 7, wherein the map is a distance contour.

11. The method for controlling the camera mounting device according to claim 7, wherein the map is an area map.

12. A non-transitory computer-readable medium storing a program which when executed by a computer, causes the computer to perform a method for controlling the camera mounting device, the method comprising:

loading a map on a display screen of a wearable remote control;
selecting a target on the map;
sending a signal to a camera and a camera mounting device from the wearable remote control;
determining coordinates of the target selected on the map;
determining coordinates of a user with respect to the camera mounting device;
calculating a rotation angle of the camera mounting device;
sending a rotation signal to an azimuth motor of the camera mounting device;
displaying a camera-view on the display screen of the wearable remote control;
selecting an elevation; and
sending an elevation signal to an elevation motor of camera mount.

* * * * *